United States Patent [19]

Parisot et al.

[11] 4,408,287
[45] Oct. 4, 1983

[54] AUTOMATIC-SEARCH MICROFICHE READER INVOLVING THE USE OF A MICROCOMPUTER

[76] Inventors: Daniel Parisot; Dominique Mariaulle, both of 131, Avenue Foch, Résidence Les Platanes, F-78400 Chatou, France

[21] Appl. No.: 266,345

[22] Filed: May 22, 1981

[30] Foreign Application Priority Data

May 23, 1980 [FR] France .................. 80 11540

[51] Int. Cl.³ .................. G03B 23/08; G06F 15/02
[52] U.S. Cl. .................. 364/518; 364/900; 353/27 A
[58] Field of Search .................. 364/200, 900, 518; 353/23 A, 26, 29

[56] References Cited

U.S. PATENT DOCUMENTS

| | | | |
|---|---|---|---|
| 3,188,910 | 6/1965 | Brownscombe et al. | 353/25 |
| 3,528,735 | 9/1970 | Bluitt et al. | 353/27 A |
| 3,744,891 | 7/1973 | Dennis et al. | 353/27 A |
| 3,868,645 | 2/1975 | Delplanque et al. | 353/26 A |
| 4,110,020 | 8/1978 | Johnson et al. | 353/27 A |
| 4,174,890 | 11/1979 | Johnson et al. | 353/26 A |
| 4,174,891 | 11/1979 | Flint et al. | 353/26 A |
| 4,179,743 | 12/1979 | Suzuki et al. | 353/27 A |

Primary Examiner—Felix D. Gruber
Assistant Examiner—Douglas H. Rutherford
Attorney, Agent, or Firm—Michael J. Striker

[57] ABSTRACT

A microfiche reader provided with a keyboard of the type comprising a radiation emitter such as an infrared radiation emitter, each key being associated with an emitter modulation code and the modulated signal being detected by a photoreceiver. A microcomputer serves to decode the signal delivered by the photodetector and to generate suitable electrical signals for controlling drive motors which initiate the displacements of a microfiche support plate.

8 Claims, 7 Drawing Figures

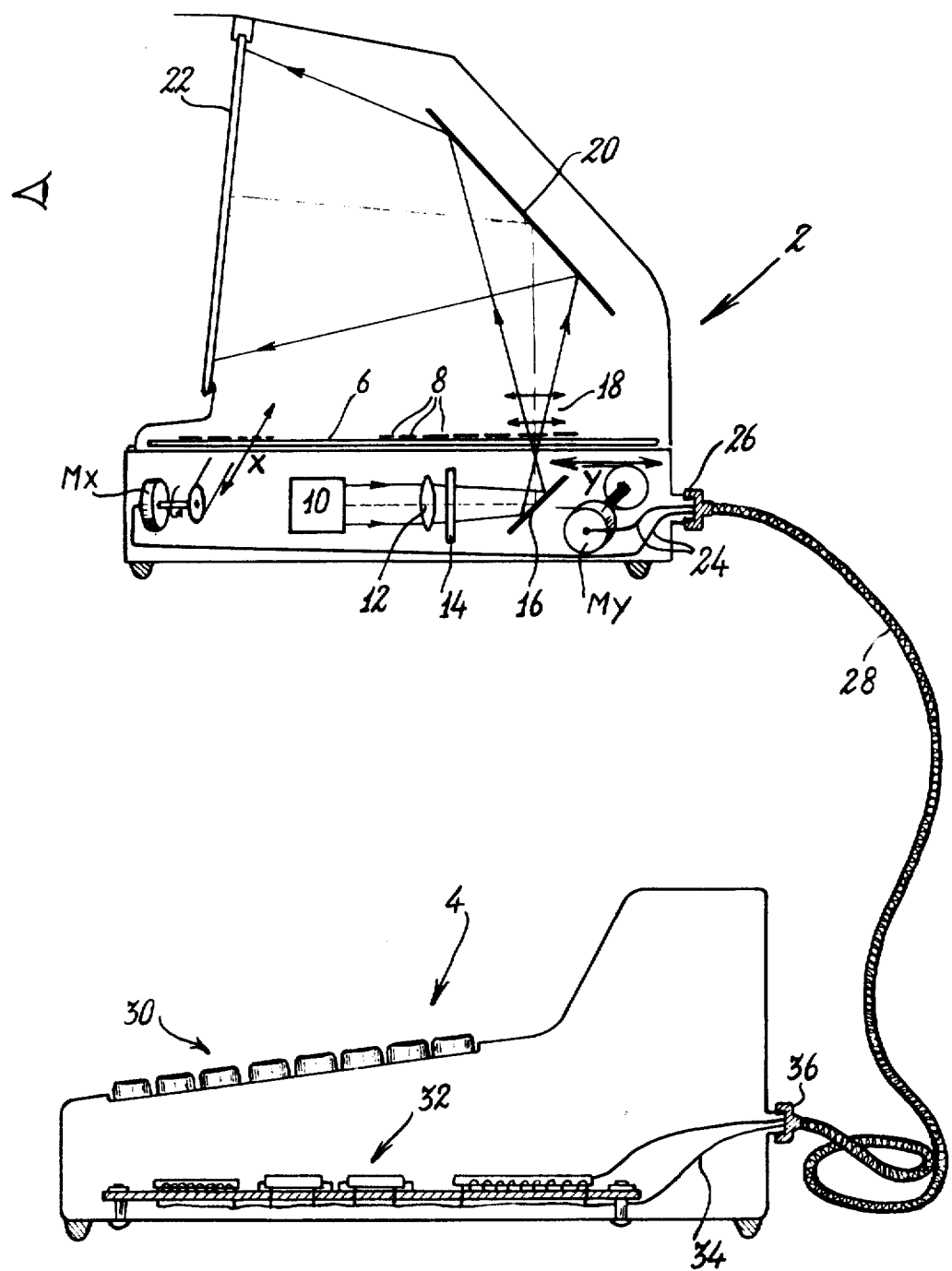
Fig:1

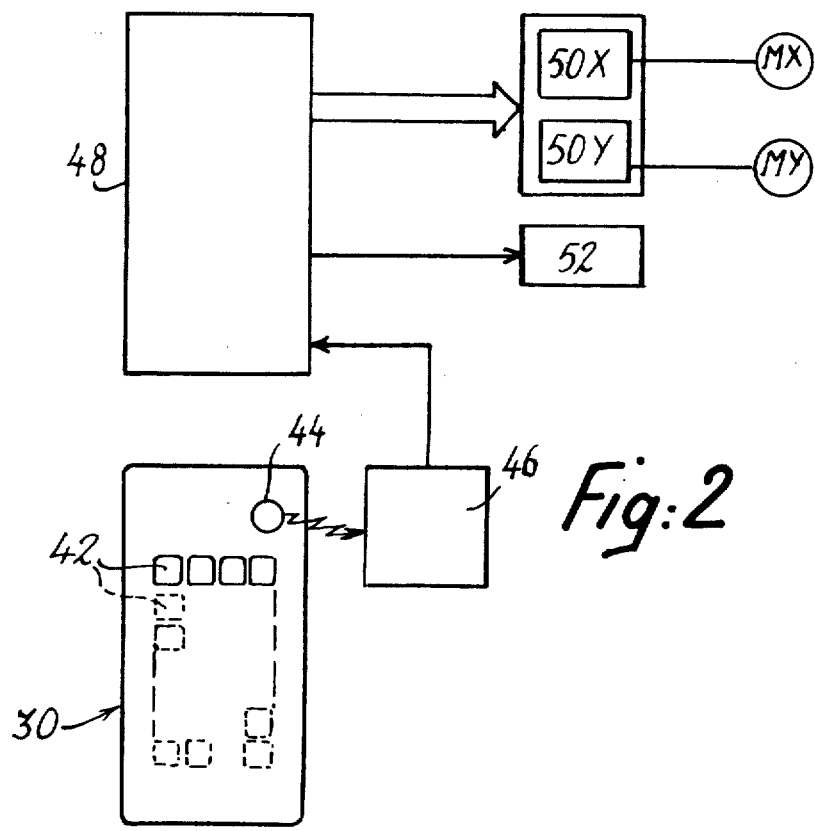
Fig:2
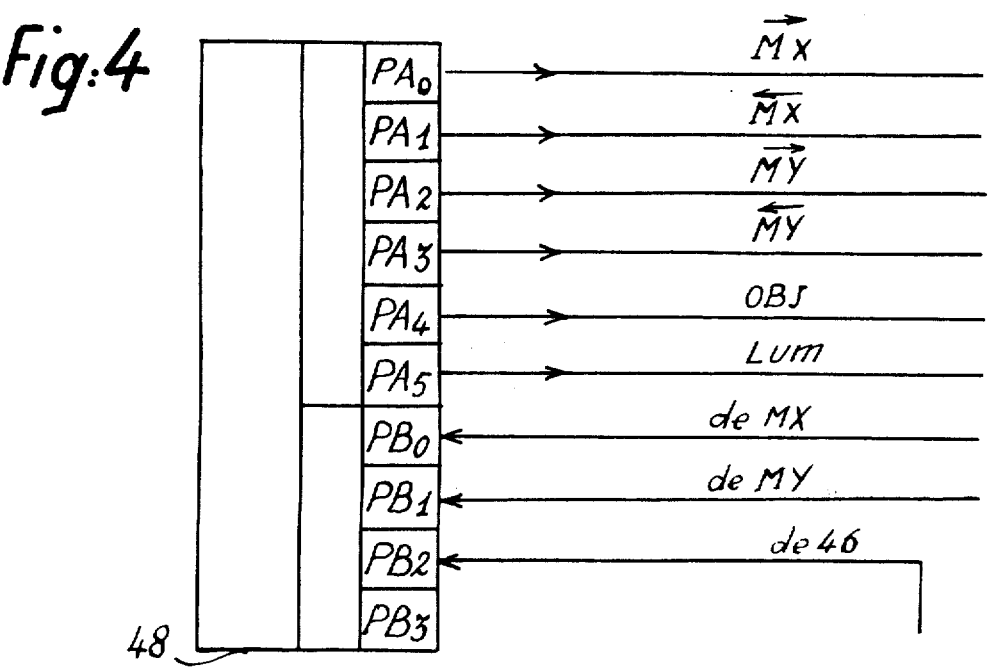
Fig:4

AUTOMATIC-SEARCH MICROFICHE READER INVOLVING THE USE OF A MICROCOMPUTER

This invention is directed to an automatic-search microfiche reader which makes use of a microcomputer. The invention is applicable to the construction of equipment units for reading or reproduction of documents recorded on microfilm.

In a conventional reader, microfiches are placed in front of an optical projector by means of a support plate which is capable of displacement in two rectangular directions X and Y. In some types of readers, the support plate is driven by two electric motors and the operator is provided with a keyboard for controlling the selection of a microfiche. To this end, each key is designated by an alphanumeric code which corresponds to the coordinates of the microfiche cards expressed in the same code. By depressing two keys in succession, the operator initiates the emission of two series of electrical pulses which in turn start-up the two motors, thus bringing the selected microfiche in the correct position in front of the optical projector.

While it is true that units of this type represent an improvement upon manual control devices, they are nevertheless attended by a number of disadvantages. In the first place, they are liable to produce framing errors when a number of back-and-forth displacements are carried out between an index card and work cards since the index card is finally positioned off-center. Furthermore, equipment units of this type are of somewhat limited application aside from the ordinary functions of microfiche positioning and a few subsidiary functions such as opening of the card-changer or switchover to manual operation.

A different type of microfiche reader which has made a more recent appearance utilizes the resources of micro-data-processing and especially microprocessors. In equipment units of this type, a keyboard consists of keys designated by a literal code which determines an instruction for the movement of the support plate in the direction X, keys designated by a digital code which determines an instruction for the movement of the support plate in the direction Y, and keys corresponding to particular functions. In a keyboard of this type, the keys constitute electrical contacts, the complete assembly being wired in the form of a matrix of lines and columns. These units are usually provided with a search circuit for the key which is actuated by the operator. Said search circuit comprises two demultiplexers in which the inputs-outputs are connected respectively to the lines and to the columns of the keyboard matrix and a sweep computer, the contents of which identify at each instant the line and the column being scanned by the two multiplexers. Finally, provision is made in these readers for an interface circuit and a microcomputer. The appearance of a short-circuit between one line and one column of the keyboard produces an interruption in the microprocessor which accordingly identifies the selected key and performs the instruction corresponding to this key. An interface circuit placed between the microcomputer and the circuit for supplying current to the motors completes the unit.

Although readers of this type represent a further technological advance with respect to readers of the prior art, they still suffer from drawbacks which arise in particular from the complexity of the keyboard and of the microcomputer.

The precise aim of the present invention is to provide a microfiche reader of simplified design which reduces its cost price to a marked degree while ensuring enhanced performances.

These aims are achieved in accordance with the invention by resorting to the use of a keyboard of the type comprising a radiation emitter such as an infrared emitter, for example. Each key is associated with an emitter modulation code, the modulated signal being then detected by a photoreceiver. The advantage of this type of link lies in the fact that it avoids the use of a transmission cable. According to the invention, the reader further comprises a microcomputer which is capable of decoding the signal delivered by the photodetector and of generating suitable electrical signals for controlling the drive motors which produce the displacements of the support plate. According to the invention, the microcomputer is constituted by a single housing containing all the means which are necessary for decoding and for forming the control signals.

It will therefore be observed that the signal delivered by the photodetector is not decoded by a particular decoding circuit as is the customary practice in this type of apparatus but by the microcomputer which is provided with a suitable decoding program.

The features and advantages of the invention will in any case be more apparent upon consideration of the following description and accompanying drawings, wherein:

FIG. 1 shows the general structure of a reader;

FIG. 2 is a block diagram showing the electronic means for controlling the reader according to the invention;

FIG. 4 is a general diagram of the microcomputer employed;

Figure 3:
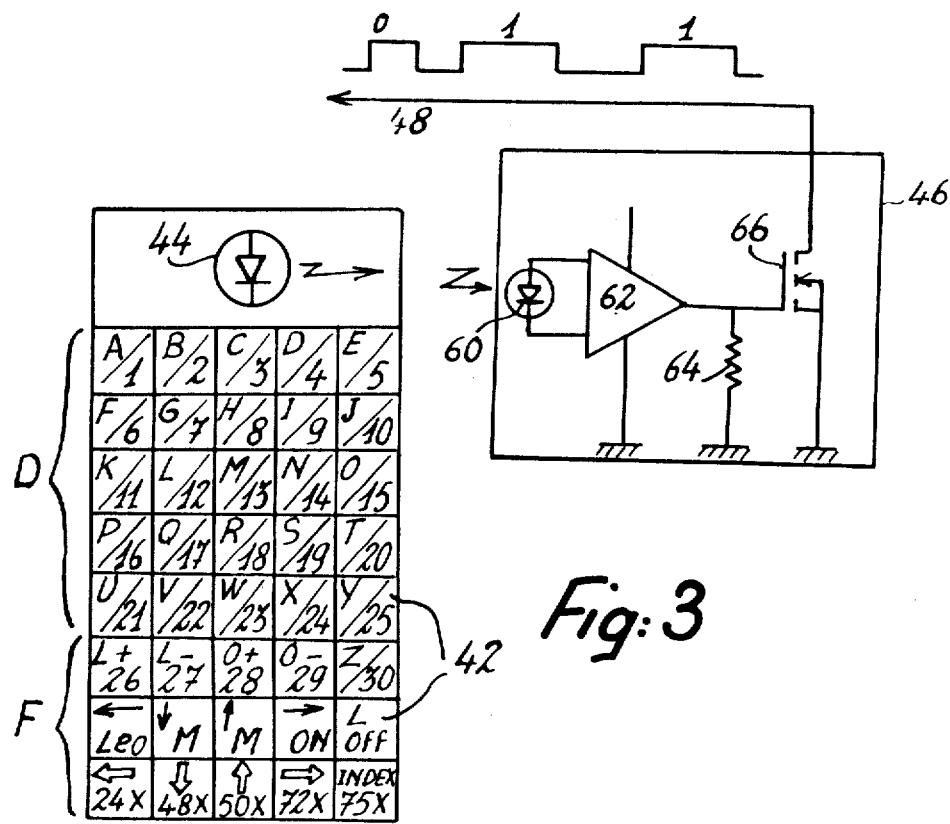
FIG. 3 illustrates a particular form of embodiment of the control keyboard.
Figure 7:
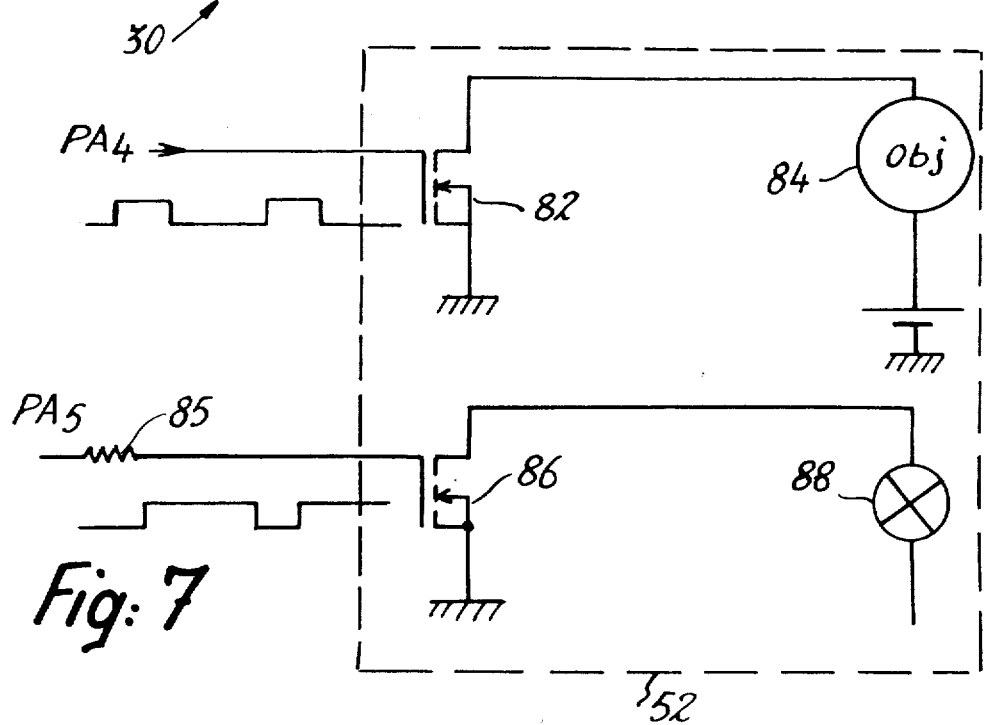
FIG. 7 is a diagram of the circuits for modulating the light intensity and controlling the objective.

The apparatus shown in FIG. 1 comprises a microfiche projector 2 and a control console 4. The projector 2 can be of any known type and may comprise for example a support plate 6 which is capable of displacement in two perpendicular directions X and Y and serves to support microfiches 8. An optical projection system comprises a light source 10 constituted by a tungsten-halogen lamp, a lens 12, a filter 14, a first reflecting mirror 16, a focusing objective 18, a second reflecting mirror 20 and finally a screen 22 on which appears the image of the microfiche located beneath the objective 18. Transfer from one microfiche to another takes place by means of a movement of translation of the support plate 6 in the directions X and Y. This movement is controlled by two motors MX and MY having either direct-current or alternating-current excitation or by two stepping motors. Control of said motors is performed by means of electrical signals, said signals being transmitted via leads 24 which terminate in a connector 26. A cable 28 connects the projector 2 to the control console 4.

Said console comprises a keyboard 30, electronic circuits 32 which deliver control signals via leads 34 and these latter terminate in a connector 36 to which the cable 28 is connected It will be readily apparent that this arrangement of the different elements is given only by way of explanation and that other arrangements could be adopted without thereby departing from the scope of the invention. Thus it follows that the projection system 2 and the control console 4 could be grouped together in a single apparatus or that the computation devices could be placed within the projection system 2. A number of projection units located at different points could also be controlled from a single console which could also be located at a considerable distance from the projection units.

The general arrangement of microfiche search control and computation means as adopted in the present invention is illustrated in FIG. 2. The keyboard 30 comprises a plurality of keys 42 which are actuated by the operator. Said keyboard is associated with an emitter 44 of the infrared type, for example, which is optically coupled to a receiver 46. This latter supplies a microcomputer 48 which is capable of carrying out the instructions corresponding to the selected keys. To this end, the microcomputer delivers electrical signals which are directed to interface circuits 50X and 50Y for controlling the motors MX and MY. The microcomputer can also control ancillary equipment devices 52.

These different means will now be described in greater detail with the aid of FIGS. 3 to 7.

Reference will first be made to FIG. 3 which illustrates one form of embodiment of a keyboard contemplated by the invention. As shown in the figure, the keyboard comprises keys which are arranged in two groups. The first group D includes all the displacement keys and the second group F includes all the function keys.

The displacement keys each contain two reference symbols, namely a literal symbol within a range extending from A to Z, for example, and a digital symbol. The first symbol corresponds to a displacement along the X-axis and the second symbol corresponds to a displacement along the Y-axis. Despite the presence of two reference symbols, each key corresponds only to one modulation code for the signal generated by the emitter 44. A distinction is made between the two orders corresponding to the two reference symbols in the case of the microcomputer which associates the corresponding literal symbol with the first code received (namely an order for displacement along the X-axis) and associates the corresponding digital reference symbol with the second code received (that is, an order for displacement along the Y-axis). In the case of the displacement keys, the microcomputer generates the control signals only after having received two codes corresponding to two actions on the keys of the keyboard.

Each microfiche is designated by an alphanumeric code (K5, for example) and this code appears on an index microfiche which usually corresponds to P18. In order to initiate the appearance of the microfiche K5 by means of the keyboard of FIG. 3, the operator first depresses the key which is designated by the reference K11, then the key designated by the reference E5. In point of fact, the microfiche reader according to the invention starts up only after receiving both codes.

The keys of the second group relate to a number of different functions. These keys also bear two reference symbols, the distinction being again made by the microcomputer which can nevertheless emit a control signal as soon as the first code has been received without awaiting the second code.

By way of explanation, the functions to be processed can be the following;

L+: increase in light intensity,

L−: reduction of light intensity,

O+: adjustment of the objective in one direction,

O−: adjustment of the objective in the other direction,

←, ↑, →, ↓ : fine centering of the image if the microfiche card is not a standard card, or in the directions X-left, Y-top, X-right, Y-bottom, >: opening of the card-changer, ⇐, ⇑, ⇒, ⇓ :jump from a view on the left, at the top, on the right, at the bottom, INDEX: selection of index view, LECT: storage/reading view, M↓, M↑ : input or output of stored views,

ON

OFF 24X, 48X, 50X, 72X, 75X: control of the different magnifications, 26, 27, 28, 29: various functions which can be defined as required.

Each key of the keyboard controls suitable electronic means which determine a modulation code of the emitter 44. This code can be constituted by the time-duration of the top level of a signal. It is postulated, for example, that a "0" will be represented by a pulse having a time-duration of 50 ms and that a "1" will be represented by a pulse having a time-duration of 100 ms. Each emitted signal is accordingly formed by a sequence of 1 and of 0.

The emitter 44 is optically coupled to a receiving circuit 46 comprising a detector 60 (such as a phototransistor, for example), an amplifier 62 (such as an operational amplifier, for example), a resistor 64, an interface transistor 66 which is preferably of the VMOS type (vertical metal oxide semiconductor having a V-shaped groove structure). This transistor delivers a signal which is modulated in accordance with the code defined earlier (in the figure, the signal is 011), this signal being directed to the microcomputer 48.

The inputs-outputs of said microcomputer are shown diagrammatically in FIG. 4. The inputs are four in number: $PB_0$, $PB_1$, $PB_2$ and $PB_3$. Only the first three inputs are employed. The inputs $PB_0$ and $PB_1$ receive signals delivered by two cells mX and mY for measuring the angle of rotation of the motors as will hereinafter become more readily apparent; the input $PB_2$ receives the signal delivered by the receiving circuit 46; the input $PB_3$ remains available.

The microcomputer 48 is also provided with a certain number of outputs, six of which are shown in this figure and designated respectively by the reference $PA_0$, $PA_1$, $PA_2$, $PA_3$, $PA_4$ and $PA_5$. These outputs are provided with flip-flops which serve to maintain the value of the delivered signals. These signals are as follows:

on $PA_0$: control of the motor MX in one direction ($\vec{MX}$), on $PA_1$: control of the motor MX in the other direction ($\overleftarrow{MX}$), on $PA_2$: control of the motor MY in one direction ($\vec{MY}$), on $PA_3$: control of the motor MY in the other direction ($\overrightarrow{MY}$), on $PA_4$: control of the objective (OBJ), on $PA_5$: control of the light intensity (LUM).

In accordance with known practice, the microcomputer comprises a central processing unit, a PROM memory (programmable read-only memory) or an EPROM memory (erasable programmable read-only memory) and a RAM memory (random-access memory).

The programmable memory contains the program of instructions of the microcomputer. The random-access memory provides the microcomputer with the tables corresponding to the different functions to be performed. A function indicated in one of these tables corresponds to each code received and can be performed by means of the instruction program contained in the programmable memory.

The microcomputer 48 is not described here in constructional detail since this is within the capacity of anyone skilled in the art. It will simply be mentioned by way of explanation that a microcomputer which is suited to this application is the "8048" microcomputer commercialized by the Intel Company. The relevant commercial brochures contain all the indications which are necessary for the practical utilization of this circuit.

Figure 5:
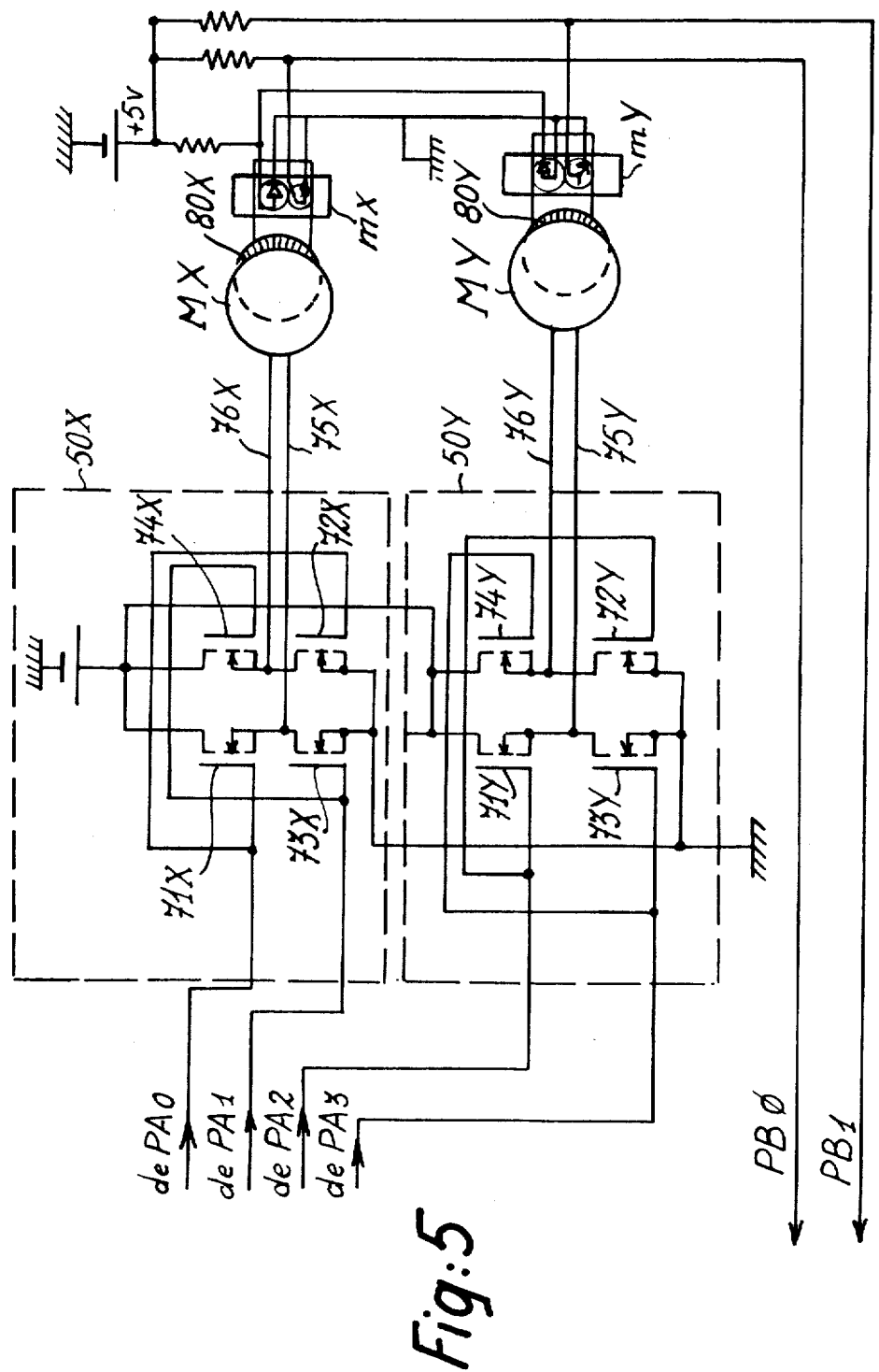
FIG. 5 illustrates a particular form of embodiment of means for controlling the displacement motors.

FIG. 5 illustrates the means for controlling the motors MX and MY in the event that these latter are of the direct-current excitation type. Another example will be described in FIG. 6 in the case of stepping motors. In the first example, the interface circuits 50X-50Y are constituted by VMOS transistors arranged in a so-called "double totem-pole" assembly. The stage 50X thus comprises two transistors 71X and 72X having a gate controlled by the signal derived from the output $PA_0$ of the microcomputer and two transistors 73X and 74X, the gates of which receive the signal derived from the output $PA_1$. Two output connections 75X and 76X serve to supply current to the motor MX in order to cause this latter to rotate either in one direction or in the other.

Similarly, the stage 50Y is constituted by two pairs of transistors 71Y-72Y and 73Y-74Y for supplying two leads 75Y and 76Y which are connected to the motor MY.

By means of an interface of this type, the signals delivered by the microcomputer to the pairs of outputs $PA_0$-$PA_1$ and $PA_2$-$PA_3$ are either equal to zero (in which case the motor is at a standstill) or at complementary levels, that is to say equal to 0−1 or 1−0 according to the direction of rotation to be given to the motor.

The angle of rotation of each motor can advantageously be controlled by means of a loop which makes use of an optical disk provided with openings or radial reflecting zones, said disk being mounted on the rotor of the motor. A photoemitter-photodetector pair serves to generate an electrical signal formed by pulses, the number of which is directly proportional to the angle of rotation of the motor. Said signal is applied as feedback to the microcomputer which carries out counting of the pulses and determines the instant at which a predetermined number is reached, which accordingly initiates return to zero of the supply current and stopping of the motor.

In FIG. 5, the optical disks bear the references 80X and 80Y and the photodetector cells bear the references mX and mY. The signal delivered by mX is applied to the input $PB_0$ and the signal delivered by mY is applied to the input $PB_1$ of the microcomputer.

Figure 6:
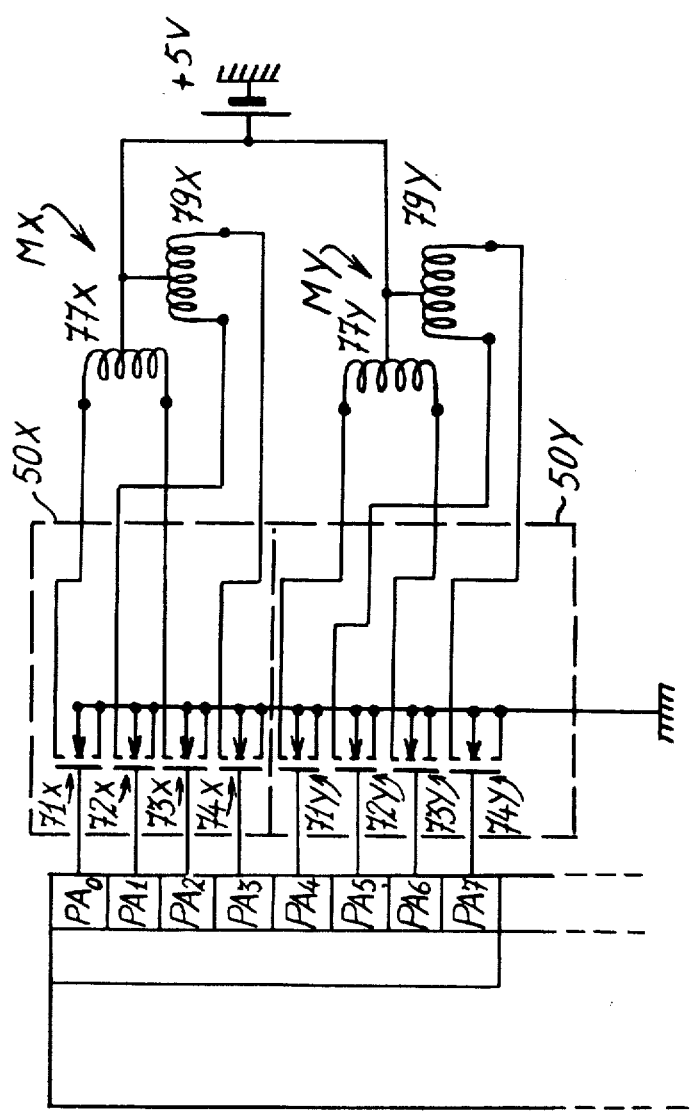
FIG. 6 illustrates another form of embodiment of the means for controlling the displacement motors in the event that these latter are stepping motors.

FIG. 6 illustrates another form of embodiment of the means for controlling the motors in the event that these latter are of the stepping type. The interface circuits 50X and 50Y are again constituted by four VMOS transistors, namely the transistors 71X to 74X in the case of the circuit 50X and the transistors 71Y to 74Y in the case of the circuit 50Y. Each stepping motor MX, MY has two excitation windings consisting respectively of the windings 77X, 79X in the case of the first motor and the windings 77Y, 79Y in the case of the second motor. These windings also have a center tap connected to a direct-current voltage supply of 5 V, for example. The microcomputer has eight outputs which are utilized and designated by the references $PA_0$ to $PA_7$.

The winding 77X is controlled by the transistors 71X and 73X which are in turn controlled by the outputs $PA_0$ and $PA_2$ of the microcomputer. The winding 79X is controlled by the transistors 72X and 74X which are in turn controlled by the outputs $PA_1$ and $PA_2$ of the microcomputer. This mode of connection is reproduced in the case of the motor MY; the winding 77Y is controlled by the transistors 71Y and 73Y which are connected to the outputs $PA_4$ and $PA_6$ and the winding 79Y is controlled by the transistors 72Y and 74Y which are connected to the outputs $PA_5$ and $PA_7$.

The advantage of this circuit arrangement lies in the fact that it permits the appearance of a current peak at the time of startup of the motors. It is also conducive to high precision in the displacement of the support plate and to a high access speed, thus making it possible to adopt magnifications up to 300X (and correlatively high reduction values).

In addition, the microcomputer is capable of performing other functions which make the reader according to the invention particularly convenient to use. By way of example, such functions may include modulation of the intensity of the light source of the optical projector and adjustment of the objective. These practical means are illustrated schematically in FIG. 7.

The output $PA_4$ of the microcomputer transmits a square-wave signal which is applied to the gate of a VMOS transistor 82. Said transistor controls a motor 84 which produces action on the objective in order to modify the adjustment of this latter.

Furthermore, the output $PA_5$ of the microcomputer delivers to a resistor 85 a signal whose cyclic ratio determines the light intensity of the projector. Said signal is applied to the gate of the transistor 86 which is again of the VMOS type and controls the light source 88 of the projector. The cyclic ratio of the control signal is so adjusted as to reduce the light intensity during a change of card.

The VMOS transistors employed in the invention can be those commercialized by the Siliconix Company. The type designated as VN64GA may thus be adopted for the transistor 86 and the type designated as VN66AF or V10KN may be adopted for the transistor 82. The stepping motors can be of the type manufactured by the Superior Electric Company and designated as "SLOW SYN" or of the type manufactured by the Sanyo Denki Company and of the type designated as "STEP SYN".

What is claimed is:

1. An automatic-search microfiche reader, comprising
a projector including a support plate for a plurality of microfiches and movable along an X-axis and a Y-axis perpendicular to the X-axis, projection means associated to said support plate, and driving means for moving said support plate along the X-axis and the Y-axis so as to place a particular microfiche relative to said projector means;

a control console associated to said projector, said control console including a keyboard having a first group of displacement keys, each of said keys being provided with a literal reference symbol corresponding to a displacement of said support plate along the X-axis and with a digital reference symbol corresponding to a displacement of said support plate along the Y-axis, and a second group of keys, each of which represents additional function keys; and means for controlling said driving means and including an emitter associated to said keyboard for delivering coded radiation corresponding to each actuated key, means for detecting the coded radiation and delivering a corresponding coded electrical signal, a microcomputer receiving the coded electrical signal and being programmed so that in respect of each controlled operation obtained by a double action on said displacement keys a first code received corresponds to the displacement along the X-axis and a second code received corresponds to the displacement along the Y-axis, thereby decoding the coded electrical signal and generating corresponding control signals, and interface means receiving the control signals delivered by said microcomputer for controlling said driving means.

2. A microfiche reader according to claim 1, wherein said projection means include a light source emitting a light having an intensity and means for controlling said light source so that upon changement of one microfiche through another microfiche, the intensity of the light is reduced.

3. A microfiche reader according to claim 1, wherein said projection means further includes an objective and means for accurately adjusting said objective.

4. A microfiche reader according to claim 1, wherein said microcomputer includes means for providing access to a view, means for providing selection from a number of reduction values, means for opening a card changer, means for fine centering of a card, means for providing a jump from one view to an adjacent view in said X-axis and said Y-axis directions, means for varying of light intensity, means for adjusting said projection means, and means for storing at least one view.

5. A microfiche reader according to claim 1, wherein said driving means are of a direct-current control type and provided with an optical disk and said controlling means for said driving means further includes a photocell for detecting rotation of said disk, said photocell delivering signals to said microcomputer for determining the instant of interruption of the control signals for controlling rotation of said driving means.

6. A microfiche reader according to claim 1, wherein said emitter is an infrared emitter.

7. A microfiche reader according to claim 1, wherein said driving means are of a stepping type.

8. A microfiche reader according to claim 1, wherein the interface means include four transistors of VMOS type.

* * * * *